US012779841B2

(12) United States Patent
Welten et al.

(10) Patent No.: US 12,779,841 B2
(45) Date of Patent: Nov. 3, 2026

(54) METHOD AND SYSTEM FOR DETERMINING A POSITION OF A CONVEYOR BELT

(71) Applicant: SPGPRINTS AUSTRIA GMBH, Langkampfen (AT)

(72) Inventors: Peter Welten, Boxmeer (NL); Josef Juffinger, Thiersee (AT); Michael Pokerschnig, Itter (AT)

(73) Assignee: SPGPRINTS AUSTRIA GMBH, Langkampfen (AT)

( * ) Notice: Subject to any disclaimer, the term of this patent is extended or adjusted under 35 U.S.C. 154(b) by 0 days.

(21) Appl. No.: 18/688,082

(22) PCT Filed: Jul. 29, 2022

(86) PCT No.: PCT/EP2022/071385
§ 371 (c)(1),
(2) Date: Feb. 29, 2024

(87) PCT Pub. No.: WO2023/006960
PCT Pub. Date: Feb. 2, 2023

(65) Prior Publication Data

US 2024/0408862 A1 Dec. 12, 2024

(30) Foreign Application Priority Data

Jul. 29, 2021 (DE) ..................... 10 2021 119 731.7

(51) Int. Cl.
*B41F 33/00* (2006.01)
*B41F 33/02* (2006.01)
*B41J 11/00* (2006.01)

(52) U.S. Cl.
CPC .......... *B41F 33/0081* (2013.01); *B41F 33/02* (2013.01); *B41J 11/007* (2013.01)

(58) Field of Classification Search
CPC ...... B41F 33/0081; B41F 33/02; B41J 11/007
See application file for complete search history.

(56) References Cited

U.S. PATENT DOCUMENTS 5,774,153 A 6/1998 Kuehnle et al.
6,128,459 A * 10/2000 Iwata ................ G03G 15/0194 347/116

(Continued)

FOREIGN PATENT DOCUMENTS

AT 509 764 B1 3/2012
DE 196 10 953 A 1 10/1996

(Continued)

*Primary Examiner* — David H Banh
(74) *Attorney, Agent, or Firm* — WTA IP Law P.C.

(57) ABSTRACT

The invention relates to a printing machine for printing a material. The printing machine comprises a conveyor belt, an optical sensor and an evaluation unit. The conveyor belt is movable in a feed direction along a feed path. The conveyor belt comprises a plurality of portions along the feed direction over the feed path. The optical sensor is arranged to detect at least one image of each portion of the plurality of portions of the conveyor belt sequentially. The evaluation unit is arranged to identify or determine a position of the conveyor belt on the basis of the images of the plurality of portions of the conveyor belt.

16 Claims, 3 Drawing Sheets

(56) References Cited

U.S. PATENT DOCUMENTS

2001/0004425 A1* 6/2001 Shinohara .............. H04N 1/506 347/116
2003/0052957 A1* 3/2003 Yamada ............. G03G 15/0173 347/116
2004/0109708 A1* 6/2004 Kobayashi ......... G03G 15/0131 347/116
2006/0150852 A1 7/2006 Loddenkoetter
2006/0165442 A1* 7/2006 Kobayashi ......... G03G 15/1685 399/301
2008/0043299 A1* 2/2008 Ikeda ................. G03G 15/5058 358/518
2009/0079999 A1 3/2009 Suzuki
2009/0091773 A1* 4/2009 Kushida ................. G03G 15/50 358/1.12
2011/0026044 A1* 2/2011 Murayama ......... G03G 15/1605 358/1.5
2011/0050213 A1* 3/2011 Furukawa .............. B65G 43/04 324/228
2011/0097125 A1* 4/2011 deJong ............... G03G 15/6564 399/394
2011/0222882 A1 9/2011 Sugiyama et al.
2012/0243014 A1* 9/2012 Goto .................. G03G 15/5058 358/1.12
2013/0322904 A1* 12/2013 Murayama ............. G03G 15/16 399/66
2015/0234336 A1* 8/2015 Kosaka .............. G03G 15/5058 399/301
2019/0022937 A1* 1/2019 Stelter ................... B29C 64/218
2019/0270320 A1* 9/2019 De Roeck ................ B41J 3/407
2019/0366743 A1* 12/2019 Terradellas Callau ....................... B41J 11/007
2020/0316959 A1* 10/2020 Shinsawatsu .......... B41J 2/2103
2021/0101393 A1* 4/2021 Mizusawa .............. B41J 11/007

FOREIGN PATENT DOCUMENTS

DE 102 54 836 A 1 6/2004
DE 102006050120 A1 4/2008
DE 102011009823 A1 8/2012

* cited by examiner

METHOD AND SYSTEM FOR DETERMINING A POSITION OF A CONVEYOR BELT

TECHNICAL FIELD OF THE INVENTION

The invention relates to a printing machine for printing a material, in particular a fabric. Furthermore, the invention relates to a method for determining a position of a conveyor belt of a printing machine. Furthermore, the invention relates to a method for operating a printing machine, in particular for controlling or for regulating a printing machine. cl TECHNICAL BACKGROUND In printing machines, for example in digital textile printing machines, precise positioning of the material to be printed, for example fabric, paper, cardboard, plastic, wood or metal, relative to a printing head of the printing machine ensures a good printing result. Even the smallest deviation can lead to an unusable printing result.

For example, a fabric or other material to be printed can be applied or glued to a conveyor belt, also known as a printing belt. The conveyor belt can move relative to the printing head. The printing head, which is also movable, can apply a printing agent, for example a colourant, to a portion of the fabric in a desired pattern while the conveyor belt and the fabric are stationary relative to the printing head. The printing head can print the same area of the fabric several times while the conveyor belt and the material to be printed are stationary relative to the printing head. To do this, the printing head can be moved at least twice or even four times across the width of the conveyor belt. The conveyor belt can then be moved further and the printing head can apply the printing medium, e.g. in the form of a dye or ink, to another portion of the material. If the conveyor belt and thus the fabric is not moved relative to the printing head with an accuracy corresponding to the printing solution, the printed pattern on the fabric may be interrupted or a printing error in the form of an offset or a line may be visible. The printing error can be an (undesired) gap in the pattern or an (undesired) overlap in the pattern. The printing error can also be a left-right offset in the pattern. In the case of a left-right offset, there may be a wedge-shaped gap and/or a wedge-shaped overlap in the pattern. There may be a gap on one side (perpendicular to the feed direction) of the pattern and an overlap on the other side. The inaccuracy of the position of the conveyor belt to the print head can result from out-of-roundness of drive and/or deflection rollers, bearing tolerances, thickness tolerances or material weaknesses of the conveyor belt, etc.

AT 509 764 B1 relates to a measuring device of a printing machine for measuring the feed of a conveyor belt of the printing machine. The measuring device has at least one position sensor that can be attached to the conveyor belt and can be moved linearly, as well as a stationary reference device. The relative position of the position sensor to the stationary reference device is detected. The position sensor is formed as a measuring sensor.

SUMMARY OF THE INVENTION

The invention is based on the task of providing a printing machine which enables the position of a conveyor belt of the printing machine to be determined with a high degree of accuracy. Furthermore, the invention is based on the task of providing a printing machine which makes it possible to determine the position of a conveyor belt of the printing machine in a short time. Furthermore, the invention is based on the task of providing a printing machine by means of which the position of a conveyor belt of the printing machine can be determined at low cost.

The task is solved by the features described in the independent patent claims. Advantageous embodiments are given in the dependent claims.

A printing machine for printing a material comprises a conveyor belt, an optical sensor and an evaluation unit. The conveyor belt is movable in a feed direction along a feed path. The conveyor belt comprises a plurality of portions along the feed direction over the feed path. The optical sensor is arranged to detect at least one image of each portion of the plurality of portions of the conveyor belt sequentially. The evaluation unit is arranged to identify or determine a position of the conveyor belt on the basis of the images of the plurality of portions of the conveyor belt.

The evaluation unit can be used to check whether there is a deviation between the desired positioning and the actual positioning of the material to be printed. In particular, the distance by which the desired positioning and the actual positioning deviate from each other can be checked. The deviation can be periodic. For example, if a roller of the conveyor belt shows out-of-roundness, a positioning deviation can occur periodically. With each revolution of the roller, there may be a deviation at the same rotational position of the roller (in cylindrical coordinates at the same circumferential angle $\varphi$). Positioning deviations can also occur periodically due to unevenness or differences in the thickness of the conveyor belt. The positioning deviations can be compensated and/or form a basis for future positioning. In particular, the positioning deviations can be a basis for (direct) subsequent positioning, for example at the same points on the conveyor belt during the next revolution. The positioning deviations can also be a basis for correction values. Future positioning can be carried out on the basis of the correction values. The correction values can be stored in a memory, for example in a memory of a control device.

In general, the position of the conveyor belt can be an absolute position or a relative position. The relative position of the conveyor belt can refer to a reference element, for example a printing head. Likewise, the relative position of the conveyor belt can refer to a target position of the conveyor belt. For example, the relative position of the conveyor belt can be a deviation of the actual position of the conveyor belt (actual position of the conveyor belt) from the desired position of the conveyor belt (target position of the conveyor belt).

The material to be printed can be a textile material, in particular a fabric. The material to be printed can be any printable material, in particular a material that can be printed with ink.

The printing machine may comprise a motor, in particular an electric motor. At least one roller of the printing machine can be driven, in particular rotated, by the motor. The conveyor belt can rest on the at least one roller. The conveyor belt can be non-positively connected to the at least one roller. The conveyor belt can be moved by rotating the at least one roller.

The printing machine can comprise at least one second roller. The second roller might not be drivable by the motor. The second roller can be mounted so that it can rotate freely. The second roller can be non-positively connected to the conveyor belt.

The conveyor belt can be tensioned and/or supported by the first roller and the second roller. If the first roller is driven by the motor, the conveyor belt is moved. The second roller can rotate as the conveyor belt moves.

The first and second rollers of the printing machine may be driven by a motor or each driven by a motor.

The printing machine may include a control device. The control device can control the movement of the conveyor belt, in particular the motor.

The material to be printed can be arranged on the conveyor belt. The material to be printed can be (detachably) connected to the conveyor belt by an electrostatic force, by mechanical fastening, by bonding or by a thermoplastic layer of the conveyor belt. It is preferred that the conveyor belt comprises a thermoplastic layer through which the material to be printed can be (detachably) connected or bonded to the conveyor belt.

The optical sensor can be an electro-optical sensor. The optical sensor can convert light or a change in light into an electrical signal. The light can be ultraviolet light, (human) visible light and/or infrared light. The light can have a wavelength in a range from 100 nm to 1500 nm, preferably from 380 nm to 1000 nm, more preferably between 380 nm and 780 nm or between 800 nm and 900 nm. The optical sensor can be a camera or comprise a camera.

The optical sensor may have a distance to an edge of the conveyor belt of at least 10 cm, preferably at least 30 cm, more preferably at least 50 cm. The distance between the optical sensor and an edge of the conveyor belt can be at most 1.5 m, preferably at most 1.0 m, more preferably at most 0.8 m. Preferably, the distance between the optical sensor and an edge of the conveyor belt is between 0.1 m and 1.5 m, more preferably between 0.3 m and 1.0 m, more preferably between 0.6 m and 0.8 m. The edge of the conveyor belt can be an end of the conveyor belt perpendicular to the feed direction.

The optical sensor can have a distance to an edge of the conveyor belt of at least 5% of the width of the conveyor belt, preferably at least 15% of the width of the conveyor belt, more preferably at least 25% of the width of the conveyor belt. The distance of the optical sensor to an edge of the conveyor belt can be at most 80% of the width of the conveyor belt, preferably at most 55% of the width of the conveyor belt, more preferably at most 45% of the width of the conveyor belt, more preferably at most 32% of the width of the conveyor belt. Preferably, the distance between the optical sensor and an edge of the conveyor belt is between 5% and 80% of the width of the conveyor belt, more preferably between 15% and 55% of the width of the conveyor belt, more preferably between 32% and 45% of the width of the conveyor belt. The width of the conveyor belt can be a (total) extension of the conveyor belt perpendicular to the feed direction.

The conveyor belt can have a width of at least 0.5 m, preferred at least 1.0 m, more preferably at least 1.5 m. The width of the conveyor belt can be between 0.5 m and 7.0 m, preferably between 1.0 m and 6.0 m, more preferably between 1.5 m and 5.0 m, more preferably between 1.5 m and 4.0 m.

The optical sensor can be directed towards an edge region of the conveyor belt. The plurality of portions along the feed direction may be present in an edge region of the conveyor belt. An edge region may have a distance from the edge of the conveyor belt of less than 300 mm, preferably less than 150 mm, more preferably less than 50 mm, more preferably at most 30 mm. The edge of the conveyor belt can be an end of the conveyor belt perpendicular to the feed direction.

In the direction of the feed direction, the optical sensor may have a distance from a printing head of the printing machine that is substantially (±10% or ±5%) a multiple of a feed step (also referred to as a movement step). A feed step can be a distance of a movement of the conveyor belt in the feed direction between two printing steps. The material to be printed can be printed while the conveyor belt is not moving, then the conveyor belt can be moved in a feed step, after which the material to be printed can be printed. It is preferred that the material to be printed is not moved during the movement of the conveyor belt. The distance in the direction of the feed direction between the optical sensor and the printing head can be at most 1 m, preferably at most 0.8 m, more preferably at most 0.6 m, more preferably at most 0.4 m, more preferably at most 0.2 m, more preferably at most 0.1 m.

The conveyor belt can be movable in exactly one feed direction. The feed distance can be the entire length of the conveyor belt. It is preferred that the feed path is equal to the circumference, in particular the outer circumference, of the conveyor belt. The feed path can be longer than the entire length of the conveyor belt or the circumference of the conveyor belt.

The conveyor belt can be a continuous belt (endless belt). The feed path can be at least 5 metres, preferably at least 10 metres, more preferably at least 20 metres, more preferably at least 50 metres, more preferably at least 100 metres, more preferably at least 500 metres, more preferably at least 1000 metres, more preferably at least 2000 metres. The feed path can be at least a multiple of the length or the circumference of the conveyor belt, preferably the feed path is at least 2 times, more preferably at least 5 times, more preferably at least 50 times, more preferably at least 100 times, more preferably at least 250 times, more preferably at least 500 times, as large as the length or the circumference of the conveyor belt.

The conveyor belt can have a length or circumference of at least 1 m, preferably at least 2 m, more preferably at least 4 m, more preferably at least 5 m, more preferably at least 8 m The plurality of portions along the feed direction can be present over the entire feed path. The plurality of portions can be evenly or unevenly distributed.

The optical sensor can detect images over the entire length or the entire circumference of the conveyor belt, in particular in the feed direction.

The printing machine may be a textile printing machine, in particular a digital textile printing machine. The printing machine may comprise a printing head. The printing machine may comprise at least two, preferably at least three, more preferably at least four, more preferably at least five, more preferably at least six, more preferably at least eight, more preferably at least twelve, printing heads. The printing head or printing heads can be provided for each colour. The printing head or printing heads can be arranged in a printing head support (carriage). The printing machine may be an inkjet printing machine.

The printing head can be movable relative to the conveyor belt, in particular in a direction that is not parallel to the feed direction. The printing head can be moved perpendicular to the feed direction (linear). In particular, a printing head support with the printing head or printing heads can be moved relative to the conveyor belt.

The printing resolution of the printing machine can have at least 500 dpi (dots per inch), preferably at least 700 dpi, more preferably at least 900 dpi, more preferably at least 1100 dpi, more preferably at least 1200 dpi. It is particularly preferred that the printing machine has a printing resolution of between 1100 dpi and 1300 dpi. The printing resolution of the printing machine can be essentially (±10% or ±5%) 1200 dpi.

The printing machine may be arranged to determine a deviation between a desired position of the conveyor belt (target position of the conveyor belt) and an actual position of the conveyor belt (actual position of the conveyor belt) of less than 500 μm, preferably of less than 300 μm, more preferably of less than 150 μm, more preferably of less than 100 μm.

The evaluation unit may comprise a processor. The processor can determine the position of the conveyor belt on the basis of the images of the plurality of portions of the conveyor belt. The evaluation unit may be (physically) integrated into the printing machine.

Alternatively, the evaluation unit may not be (physically) integrated into the printing machine. For example, the evaluation unit can be a computer that is or is not in communication with the printing machine. The computer may not be (physically) integrated into the printing machine.

The evaluation unit can be arranged at a location remote from the printing machine. For example, the evaluation unit is a server. The server can be arranged to determine the positions of conveyor belts of different printing machines. The different printing machines can be arranged at different locations.

The evaluation unit can be in communication with the optical sensor.

In a typical printing process, a material to be printed can be arranged on the conveyor belt. The conveyor belt can be used to move the material to be printed under the printing head. The printing head can apply ink to the material to be printed. In particular, the printing head is moved perpendicular to the direction of movement of the conveyor belt in order to apply ink at least in portions over essentially the entire width of the material to be printed. The material to be printed can then be moved by the conveyor belt in the direction of the feed direction. The printing head can again apply ink to the material at least in portions over the entire width of the material to be printed. The steps of moving the conveyor belt and applying ink by the printing head can be repeated.

The evaluation unit may be arranged to determine a deviation between an actual position and a target position of the conveyor belt on the basis of the images of the plurality of portions of the conveyor belt or on the basis of the determined position of the conveyor belt.

The printing machine may comprise a control device. The control device may be arranged to adjust the movement of the conveyor belt on the basis of the deviation between the actual position and the target position of the conveyor belt.

For example, the evaluation unit can determine a curve of the deviations. A counter-curve can be created for the deviation curve. The counter-curve can be created by the evaluation unit. Alternatively or additionally, the counter-curve can be created by a user. A counter-curve created by the evaluation unit can also be changed or adjusted by a user. The control device can adjust or perform the movement of the conveyor belt on the basis of the counter-curve. Alternatively or additionally, the evaluation unit can determine counter values for the values of the deviations. The values of the deviations and the counter values can be linked, for example in a table.

The evaluation unit can continuously determine a deviation and the control device can continuously adjust the movement of the conveyor belt.

The optical sensor can be arranged stationary on the printing machine. The optical sensor can be arranged stationary relative to the printing machine.

The optical sensor can be connected to the printing machine, in particular firmly connected to the printing machine or detachably connected to the printing machine. The optical sensor can be integrated into the printing machine. For example, the optical sensor can be connected to the printing machine via a bracket or an arm. The bracket or arm can be adjustable (customisable). This allows the optical sensor to be aimed at a determined portion of the conveyor belt, especially when the conveyor belt is not moving.

Alternatively, the optical sensor may not be connected to the printing machine. The optical sensor may be held by a bracket or arm. The bracket or arm may not be connected to the printing machine. For example, the bracket or arm may be connected to a rack or a frame or support. Similarly, the bracket or arm may be placed on the floor, preferably the printing machine is placed on the same floor. Even when the optical sensor is not connected to the printing machine, but is associated with the printing machine, as the optical sensor is directed towards a portion of the conveyor belt, the optical sensor may be encompassed by the printing machine.

The optical sensor cannot change its position when the conveyor belt moves. Preferably, no component of the optical sensor changes its position when the conveyor belt moves. The optical sensor, in particular all components of the optical sensor, can be immobile or stationary when the conveyor belt moves.

The optical sensor cannot contact the conveyor belt. Preferably, no component of the optical sensor contacts the conveyor belt. The optical sensor can be arranged without contact to the conveyor belt.

The optical sensor can be a first optical sensor. The printing machine may comprise a second optical sensor. The first optical sensor and the second optical sensor may be spaced apart from each other. Preferably, the first optical sensor and the second optical sensor are spaced apart in a direction that is non-parallel, in particular perpendicular, to the feed direction. The first optical sensor and the second optical sensor can be spaced apart in a plane parallel to a plane defined by the conveyor belt. Preferably, the first optical sensor and the second optical sensor are directed towards the opposite edges of the conveyor belt or are assigned to opposite edges of the conveyor belt.

In an advantageous embodiment, the first and second optical sensors are formed in the same way. In the same way here means that the sensors are in the same way in terms of their function, e.g. are each realised by a camera.

The first optical sensor and the second optical sensor can have different distances to an edge of the conveyor belt, for example to a respective nearest edge of the conveyor belt. For example, the first optical sensor can have a distance of between 0.1 m and 0.59 m from a first edge of the conveyor belt. The second optical sensor can have a distance of between 0.60 m and 1.2 m from a second edge of the conveyor belt. The distance can be perpendicular to the feed direction.

The first optical sensor may have a distance of between 5% and 35% of the width of the conveyor belt to a first edge of the conveyor belt. The second optical sensor can have a distance of between 35% and 65% to a second edge of the conveyor belt. The first edge and the second edge can be opposite edges.

The first optical sensor may have the distance to a first edge of the conveyor belt described above. The second optical sensor may have the distance to a second edge of the conveyor belt as described above. The first edge and the second edge may be opposite edges of the conveyor belt.

The first optical sensor may be directed towards a first edge region of the conveyor belt. The second optical sensor can be directed towards a second edge region of the conveyor belt. The first edge region and the second edge region can be opposite edge regions of the conveyor belt, in particular opposite edge regions of the conveyor belt in a direction perpendicular to the feed direction.

The printing machine can comprise at least a third optical sensor. The third optical sensor may be spaced apart from the first and/or second optical sensor. Preferably, the third optical sensor is spaced from the first and/or second optical sensor in the direction of the feed direction. The third optical sensor can be directed towards the first or second edge region.

The first, second and/or third optical sensor may be any optical sensor disclosed herein.

The plurality of portions along the feed direction over the feed path may be a first plurality of portions along the feed direction over the feed path. The conveyor belt may comprise a second plurality of portions along the feed direction over the feed path. The first plurality of portions and the second plurality of portions may be spaced apart from each other. Preferably, the first plurality of portions and the second plurality of portions are spaced apart in a direction that is not parallel to the feed direction. The first optical sensor may be arranged to detect at least one image of each portion of the first plurality of portions sequentially. The second optical sensor may be arranged to detect at least one image of each portion of the second plurality of portions sequentially. The evaluation unit may be arranged to determine or determine the position of the conveyor belt on the basis of the images of the first plurality of portions and the images of the second plurality of portions.

The first plurality of portions may be present in the first edge region of the conveyor belt. The second plurality of portions may be present in the second edge region of the conveyor belt. The second plurality of portions may be present over the entire feed path. The second plurality of portions may be evenly or unevenly distributed.

The evaluation unit may be arranged to determine a first position of the conveyor belt on the basis of the images of the first plurality of portions and the evaluation unit may be arranged to determine a second position of the conveyor belt on the basis of the images of the second plurality of portions. The evaluation unit can be arranged to determine a deviation between the first position and the second position of the conveyor belt.

For example, a positioning deviation can result from a conicity or deviation from a cylindrical shape of one of the rollers on which the conveyor belt rests. One side (perpendicular to the feed direction) of the conveyor belt may have travelled further than the other side (perpendicular to the feed direction) of the conveyor belt. The resulting positioning deviation can be detected by two optical sensors and determined in the evaluation unit.

The conveyor belt can be moved along the feed direction over the feed path discontinuously or with interruptions. The conveyor belt can be moved stepwise along the feed path in the feed direction.

The printing machine can be a step-and-repeat printing machine. In a step-and-repeat printing machine, the material to be printed can be printed while the conveyor belt is stationary, i.e. is not moved. After printing, the material to be printed is transported by the conveyor belt in the feed direction. At the desired position, the transport is stopped (not moved any further) and the material to be printed can be printed on.

The optical sensor may be arranged to detect at least one image of each portion of the plurality of portions while the conveyor belt is moving and/or not moving.

The printing machine may comprise a printing head. The conveyor belt may comprise a marking element. The portions of the plurality of portions of the conveyor belt may comprise or be portions of the marking element. The printing head may be arranged to apply a marking to the marking element. The printing head may be arranged in a printing head support.

The marking element may comprise a printable material or consist of a printable material. Preferably, the printing head is arranged to print on the marking element.

The marking element can have the same length or the same circumference as the conveyor belt. The marking element can be arranged on the conveyor belt over the entire length or the entire circumference of the conveyor belt, in particular without interruption.

Preferably, the marking element is arranged on the conveyor belt in such a way that the optical sensor can detect images of the (entire) marking element, in particular when the conveyor belt is moved over its entire length.

The marking element can be arranged on the conveyor belt in an area in which a material to be printed can be arranged for printing by the printing head. Preferably, no material to be printed is arranged on the conveyor belt when the marking element is arranged on the conveyor belt.

The marking that can be applied, in particular printed, by the printing head on the marking element can be a regular marking. The marking may comprise lines.

In particular, the printing head can apply at least two reference markings to the marking element, in particular while the conveyor belt is not moving or is not being moved. Between the at least two reference markings, the printing head can apply at least one position marking, in particular while the conveyor belt is not moving or is not being moved. The conveyor belt can move or be moved between the application of the reference markings and the position marking.

The optical sensor can capture images of the markings on the marking element. The evaluation unit can identify or determine the position of the conveyor belt on the basis of the images. In particular, the evaluation unit can determine a distance (in the feed direction) between the position marking and the first reference marking. Alternatively or additionally, the evaluation unit can determine a distance (in the feed direction) between the position marking and the second reference marking. On the basis of the determined distance or the determined distances, a position of the conveyor belt can be determined by the evaluation unit, in particular a deviation from a target position to an actual position of the conveyor belt can be determined.

The printing head can apply at least three reference markings to the marking element, preferably while the conveyor belt is not moving or is not being moved. Between the first and second reference markings, the printing head can apply at least one first position marking, in particular while the conveyor belt is not moving or is not being moved. In addition, the printing head can apply a second position mark between the second and third reference markings, in particular while the conveyor belt is not moving or is not being moved. The conveyor belt can move or be moved between the application of the reference markings and the position markings.

The evaluation unit can determine a distance (in the feed direction) between the first position marking and the first reference marking and/or the second reference marking.

Alternatively or additionally, the evaluation unit can determine a distance (in the feed direction) between the second position marking and the second and/or third reference marking. On the basis of the determined distance or the determined distances, a position of the conveyor belt can be determined by the evaluation unit, in particular a deviation from a target position to an actual position of the conveyor belt can be determined.

The reference markings can be lines. Alternatively or additionally, the position marking or the position markings can be lines. The lines can be continuous lines or interrupted lines, in particular dotted lines.

The reference markings can be applied to the marking element by a first printing head. The position marking or the position markings can be applied to the marking element by a second printing head. The first printing head and the second printing head can be different printing heads. The printing heads can be arranged in a printing head support.

The marking element may be removable or releasably attachable to a surface of the conveyor belt.

The marking element can be adhered to the conveyor belt. In particular, the conveyor belt comprises a thermoplastic or a thermoplastic layer. The marking element can be (detachably) connected to the thermoplastic or the thermoplastic layer. The conveyor belt may have no thermoplastic or no thermoplastic layer when the marking element is applied to the conveyor belt. It is preferred that the marking element is applied (directly) to a surface of the conveyor belt. A thermoplastic or a thermoplastic layer cannot be understood as the surface of the conveyor belt.

The marking element can extend continuously along the feed path along the feed direction. The marking element can extend completely continuously along the feed direction on the conveyor belt.

The evaluation unit can be arranged to identify or determine the position of the conveyor belt on the basis of the marking or markings of the marking element.

The marking element can be a first marking element. The conveyor belt may comprise a second marking element. The first marking element and the second marking element can be spaced apart from each other. Preferably, the first marking element and the second marking element are spaced apart in a direction that is not parallel to the feed direction. The printing head can be arranged to apply a marking to the first marking element and to the second marking element. The first marking element and the second marking element may be spaced apart in a direction that is perpendicular to the feed direction.

The second marking element may be any marking element disclosed herein.

The first marking element may be arranged on the conveyor belt such that the first optical sensor can detect images of the (entire) first marking element, in particular when the conveyor belt is moved over its entire length. The second marking element can be arranged on the conveyor belt in such a way that the second optical sensor can detect images of the (entire) second marking element, in particular when the conveyor belt is moved over its entire length.

The at least two reference markings and the position marking can be applied to the second marking element in the same way as to the first marking element. The at least three reference markings and the two position markings can also be applied to the second marking element in the same way as to the first marking element.

Distances between markings of the second marking element can be determined by the evaluation unit in the same way as distances between markings of the first marking element.

Preferably, the evaluation unit determines a position of the conveyor belt on the basis of the distances between reference markings and position markings of the first and second marking elements. It is particularly preferred that the evaluation unit determines a deviation from a target position of the conveyor belt to an actual position of the conveyor belt on the basis of the distances between reference markings and position markings of the first and second marking elements.

The portions of the plurality of portions of the conveyor belt may comprise or be portions of a surface of the conveyor belt.

The optical sensor may be arranged to detect images (directly) from a surface of the conveyor belt. The portions of the plurality of portions may be (exclusively) surface portions of the conveyor belt.

The conveyor belt may comprise a printing region. If a material to be printed is arranged in the printing region, the material can be printed by the printing machine. Material outside the printing region of the conveyor belt cannot be printed by the printing machine.

The optical sensor can be arranged to detect images (directly) from a surface of the conveyor belt outside the printing region. The portions of the plurality of portions may be (exclusively) surface portions of the conveyor belt outside the printing region.

The conveyor belt may comprise an adhesive layer, for example a thermoplastic or thermoplastic layer, in portions. The material to be printed can be arranged or arranged on the adhesive layer.

The optical sensor can be arranged to detect images (directly) from a surface of the transport belt that does not have an adhesive layer. The portions of the plurality of portions may be (exclusively) surface portions of the conveyor belt that do not comprise an adhesive layer.

A material to be printed can be arranged on the conveyor belt when the optical sensor detects images of portions of the conveyor belt. Alternatively, no material to be printed can be arranged on the conveyor belt when the optical sensor detects images of portions of the conveyor belt. The optical sensor may have a resolution (sensitivity) of at least 400 dpi (dots per inch).

Preferably, the optical sensor has a resolution of at least 1000 dpi, more preferably at least 4000 dpi, more preferably at least 8000 dpi, more preferably at least 12000 dpi, more preferably at least 15000 dpi, more preferably at least 20000 dpi, more preferably at least 25000 dpi. The optical sensor can detect images of portions of the conveyor belt with the specified resolution. The optical sensor can have the resolution without smoothing, filtering and/or acceleration. The optical sensor cannot perform smoothing, filtering and/or acceleration.

The resolution of the optical sensor may be at least 400 cpi (counts per inch). Preferably, the optical sensor has a resolution of at least 1000 cpi, more preferably at least 4000 cpi, more preferably at least 8000 cpi, more preferably at least 12000 cpi, more preferably at least 15000 cpi. The optical sensor can detect images of portions of the conveyor belt with the specified resolution.

The optical sensor may have a tracking speed of at least 10 ips (inches per second). Preferably, the optical sensor has a tracking speed of at least 25 ips, more preferably at least 50 ips, more preferably at least 100 ips, more preferably at least 200 ips, more preferably at least 300 ips, more preferably at least 350 ips, more preferably at least 400 ips. A high tracking speed allows a high accuracy of the measurement of the optical sensor at high speeds of the conveyor belt. The optical sensor can detect images of portions of the conveyor belt at the specified tracking speed.

The optical sensor may have a frame rate of at least 1000 fps (frames per second). Preferably, the optical sensor has a frame rate of at least 2000 fps, more preferably of at least 4000 fps, more preferably of at least 6000 fps, more preferably of at least 8000 fps, more preferably of at least 10000 fps, more preferably of at least 11000 fps. The optical sensor can detect images of portions of the transport belt at the specified frame rate.

The optical sensor can be arranged to detect or recognise a movement of a substrate, for example of the conveyor belt, of less than 100 μm, preferably less than 50 μm, more preferably less than 10 μm, more preferably less than 1.0 μm. The movement can be a movement of the substrate relative to the optical sensor.

The optical sensor may comprise an illumination device. The illumination device may be capable of emitting light in the direction of the plurality of portions or emitting light onto the plurality of portions. The illumination device may be a light emitting diode (LED). The illumination device can be a laser diode. Light with a wavelength of greater than 800 nm, preferably greater than 825 nm, more preferably greater than 850 nm, can be radiated by the illumination device in the direction of the plurality of portions. In particular, light with a wavelength between 800 nm and 900 nm, preferably between 825 nm and 850 nm, more preferably between 843 nm and 853 nm, can be emitted by the illumination device in the direction of the plurality of portions. Light with a wavelength between 380 nm and 800 nm can be emitted by the illumination device in the direction of the plurality of portions.

The illumination device may comprise one or more light sources. The illumination device can comprise at least two light sources, in particular at least three light sources, wherein the light sources are arranged to generate light with (mutually) different wavelengths or (mutually) different wavelength ranges. The (respective) light can be radiated in the direction of the plurality of portions or can be radiated onto the plurality of portions.

The illumination device may be an RGB (red-green-blue) illumination device. The illumination device may comprise a light source for generating red light, a light source for generating green light and/or a light source for generating blue light. Red light can be present in a wavelength range from 630 nm to 700 nm. Green light may be present in a wavelength range from 500 nm to 560 nm. Blue light can be present in a wavelength range from 450 nm to 475 nm.

In general, the illumination device may be arranged to emit light in a mixed colour towards the plurality of portions or onto the plurality of portions. The mixed colour can result from light from different light sources.

Each of the light sources may comprise or be an LED. Each of the light sources may comprise or be a laser diode.

The illumination device may be provided external to the optical sensor.

Colourless light may be radiated through the illumination device in the direction of the plurality of portions. The light radiated towards the plurality of portions may be white light.

A distance between the surface of the conveyor belt and the optical sensor may be less than 20.0 mm. Preferably, the distance between the surface of the conveyor belt and the optical sensor is less than 15.0 mm, more preferably less than 10.0 mm, more preferably less than 7.0 mm, more preferably less than 5.0 mm, more preferably less than 3.0 mm.

The distance between the surface of the conveyor belt and the optical sensor can be at least 0.1 mm, preferably at least 0.5 mm, more preferably at least 1.0 mm.

In particular, the distance between the surface of the conveyor belt and the optical sensor is between 0.1 mm and 20 mm, preferably between 0.5 mm and 10 mm, more preferably between 1.0 mm and 3.0 mm.

A method for determining a position of a conveyor belt of a printing machine comprises the steps of: moving the conveyor belt in a feed direction along a feed path, wherein the conveyor belt comprises a plurality of portions along the feed direction over the feed path; sequentially detecting at least one image of each portion of the plurality of portions of the conveyor belt by an optical sensor; and determining the position of the conveyor belt on the basis of the images of the plurality of portions of the conveyor belt.

The printing machine may be any printing machine disclosed herein.

Disclosed is a method of operating a printing machine. The printing machine may be any printing machine disclosed herein. The method comprises the steps of: moving a conveyor belt of the printing machine in a feed direction over a feed path, wherein the conveyor belt comprises a plurality of portions along the feed direction over the feed path; sequentially detecting at least one image of each portion of the plurality of portions of the conveyor belt by an optical sensor; determining a deviation between an actual position and a target position of the conveyor belt on the basis of the images of the plurality of portions of the conveyor belt; and adjusting the movement of the conveyor belt on the basis of the deviation between the actual position and the target position of the conveyor belt.

A printing machine for printing a material comprises a conveyor belt, an optical sensor, an evaluation unit and a control device. The conveyor belt can be moved in a feed direction over a feed path. The conveyor belt comprises a plurality of portions along the feed direction over the feed path. The optical sensor is arranged to detect at least one image of each portion of the plurality of portions of the conveyor belt sequentially. The evaluation unit is arranged to determine a deviation between an actual position and a target position of the conveyor belt on the basis of the images of the plurality of portions of the conveyor belt. The control device is arranged to adjust the movement of the conveyor belt on the basis of the deviation between the actual position and the target position of the conveyor belt.

The printing machine may be any printing machine disclosed herein.

BRIEF DESCRIPTION OF THE FIGURES

In the following, the invention and/or further embodiments and advantages of the invention are explained in more detail with reference to figures, wherein the figures describe only embodiments of the invention. Identical components in the figures are provided with identical reference signs. The figures are not to be regarded as true to scale; individual elements of the figures may be exaggerated in size or simplified.

FIG. 1 shows a printing machine 100 with a conveyor belt 10 in a perspective view. The printing machine may comprise a printing head 41. The printing head 41 may be arranged in a printing head support 40. The printing head support 40 may comprise a plurality of printing heads 41. The printing head support 40 may comprise at least six printing heads 41, in particular at least six printing heads 41 per colour.

Figure 1:
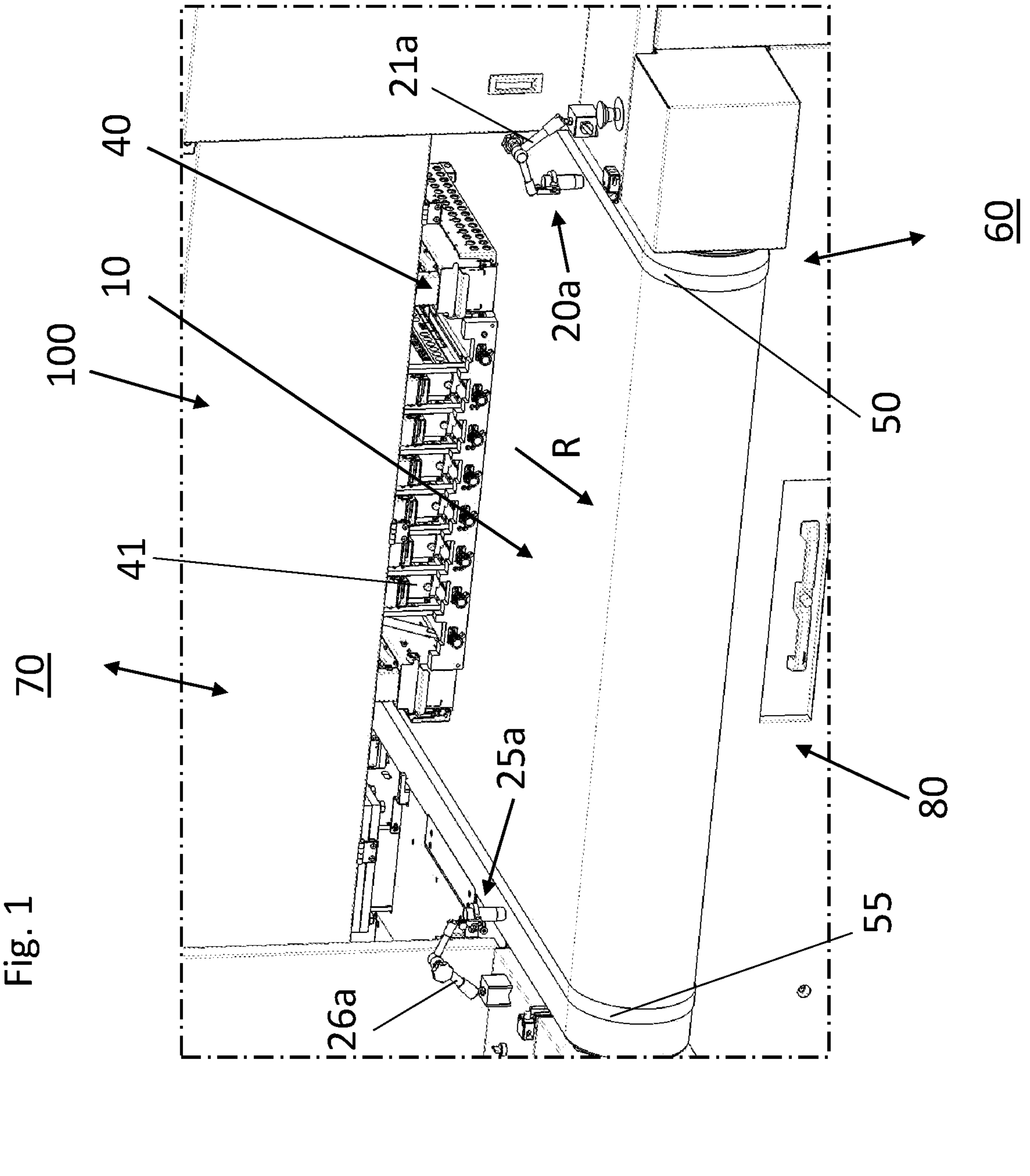
FIG. 1 shows a printing machine 100.

A material to be printed, for example a fabric, paper, cardboard, plastic, wood or metal, can be applied to the conveyor belt 10. For this purpose, the conveyor belt 10 can comprise a thermoplastic or a thermoplastic layer to which the material to be printed can be releasably adhered. The conveyor belt 10 can move the material to be printed in a feed direction R. In particular, the conveyor belt 10 positions the material to be printed relative to the printing head 41 or to the printing head support 40.

The printing head 41 can be movable, in particular linearly movable. The printing head 41 can be moved in a non-parallel direction, preferably perpendicular to the feed direction R. The printing head 41 can be moved by the printing head support 40. For this purpose, the printing head support 40 can be moved so that the printing head 41 arranged on or in the printing head support 40 is moved.

The printing machine 100 can have a first roller. In addition, the printing machine 100 may have a second roller. The conveyor belt 10 is preferably an endless belt or a continuous belt. The conveyor belt 10 can be laid around the first and second rollers and tensioned between the rollers. Preferably, the conveyor belt 10 is non-positively connected to at least one of the rollers, preferably to the first roller and to the second roller.

At least one of the rollers can act as a drive roller for the conveyor belt 10. The drive roller can be driven by a motor, for example an electric motor. The motor can cause the drive roller to rotate. The conveyor belt 10 can be moved by the rotation of the drive roller. The other roller can be non-driven and can preferably fulfil a supporting and/or holding function. Alternatively, the second roller can also be driven, in particular driven in the same way as the first roller.

In a typical printing process, the material to be printed can be applied to the conveyor belt 10. For this purpose, the material to be printed can, for example, be unrolled from a roll on which the material to be printed is stored. The conveyor belt 10 is moved a predefined distance and the printing head 41 prints a pattern on the material to be printed. For this purpose, the printing head 41 can be moved, in particular moved in such a way that the entire width (direction perpendicular to the feed direction R) of the material to be printed can be printed or is printed. The conveyor belt is then moved again a predefined distance in the direction of the feed direction R and the print head 41 prints on the material to be printed. These steps (moving the conveyor belt 10 and printing the material to be printed) can be repeated many times in order to obtain a printed material. The printed material can be released from the conveyor belt 10 at one end of the conveyor belt in the area of a roller, for example by releasing the connection of the printed material from the thermoplastic or the thermoplastic layer of the conveyor belt 10. Finally, the printed material can be stored, for example rolled up on a storage roll. Before storage, the printed material can be treated further. For example, the printed material can be dried or vaporised.

A time period of less than 1.0 s, preferably less than 0.5 s, more preferably less than 250 ms, can lie between two movement steps of the conveyor belt 10, wherein the material to be printed is preferably printed between the two movement steps.

The printing head support 40 may comprise a plurality of printing heads 41. Each of the printing heads 41 can apply a colour to the material to be printed.

The printing machine 100 comprises at least one first optical sensor 20*a*. The at least one sensor 20*a* can be arranged in a first bracket 21*a*. The bracket 21*a* can be used to hold and/or position the first optical sensor 20*a*. The bracket 21*a* may be detachably or non-detachably connected to the printing machine 100. The bracket 21*a* can be an integral part of the printing machine 100. By connecting the mount 21*a* of the first optical sensor 20*a* to the printing machine 100, a user can easily align the optical sensor 20*a* relative to the conveyor belt 10.

Alternatively, the bracket 21*a* may not be (directly) connected to the printing machine 100. For example, the bracket 21*a* may be arranged or placed on a floor next to the printing machine 100. Similarly, the bracket 21*a* may be connected to a support. Preferably, the support is not (directly) connected to the printing machine 100. This allows the optical sensor 20*a* to be decoupled from any vibrations of the printing machine 100.

The printing machine may comprise a second optical sensor 25*a*. The second optical sensor 25*a* may be arranged in a second bracket 26*a*. The second bracket 26*a* may have the same design as the first bracket 21*a*. The second optical sensor 25*a* may be arranged opposite the first optical sensor 20*a*, in particular in a direction non-parallel or perpendicular to the feed direction R. The first optical sensor 20*a* and the second optical sensor 25*a* may have a substantially (±10% or ±5%) equal distance to the printing head 41 in the feed direction R. A distance between the first sensor 20*a* and the second sensor 25*a* non-parallel or perpendicular to the feed direction R may be at least 0.5 m.

The first optical sensor 20*a* and/or the second optical sensor 25*a* may be a camera. The first optical sensor 20*a* and the second optical sensor 25*a* may be the same or different optical sensors.

The first optical sensor 20*a* and/or the second optical sensor 25*a* detects a plurality of images of portions of the conveyor belt 10 along the feed path in the feed direction R. On the basis of the images, the position of the conveyor belt 10 is determined or identified by an evaluation unit 60. In particular, on the basis of the images, evaluation unit 60 can determine or identify whether there is a deviation between a target position of conveyor belt 10 and an actual position of conveyor belt 10. If necessary, the evaluation unit 60 can determine how large the deviation between the target position and the actual position of the conveyor belt 10 is. For this purpose, the evaluation unit 60, which is in communication (indicated by the double arrow in FIG. 1) with the first and/or optical sensor 20*a*, 25*a*, can receive image data from the first and/or second optical sensor 20*a*, 25*a* and evaluate the image data.

For example, it may be provided that the conveyor belt 10, in particular the material to be printed on the conveyor belt 10, is moved by a distance of at least 50 mm relative to the printing head 41 in the feed direction R (target position of the conveyor belt 10). Preferably, the conveyor belt 10, in particular the material to be printed on the conveyor belt 10, is moved by a distance of at least 100 mm, more preferably at least 200 mm, more preferably at least 300 mm. The conveyor belt 10, in particular the material to be printed on the conveyor belt 10, can be moved by a distance of between 50 mm and 1000 mm, preferably between 50 mm and 500 mm, more preferably between 100 mm and 450 mm, more preferably between 200 mm and 400 mm. By evaluating the images of the first and/or second optical sensor 20*a*, 25*a*, it is possible to determine the distance by which the conveyor belt 10 was actually moved (actual position of the conveyor belt 10). On the basis of the deviation between the target position and the actual position of the conveyor belt 10, the evaluation unit 60 can determine a change in the movement of the conveyor belt 10, preferably for a future movement of the conveyor belt 10.

If a deviation between the target position and the actual position of the conveyor belt 10 is determined by the evaluation unit 60, the movement of the conveyor belt 10 can be changed in such a way that a deviation, in particular a future deviation, is reduced.

For example, a deviation between the target position and the actual position of the conveyor belt 10 of +100 μm can be determined by the evaluation unit 60. A positive deviation can represent that the conveyor belt 10 has been moved further than it should be moved. The deviation can also be −100 μm. A negative deviation can represent that the conveyor belt 10 was not moved far enough. A deviation in the millimetre range, in particular in the single-digit millimetre range, can also be determined by the evaluation unit 60.

For the conveyor belt 10, a large number of deviations between the target position and the actual position of the conveyor belt 10 can be determined. Preferably, the conveyor belt 10 is moved stepwise over a feed path that is at least 5 times, preferably at least 50 times, more preferably at least 100 times, more preferably at least 250 times, more preferably at least 500 times, as large as the length or circumference of the conveyor belt 10. For the conveyor belt 10, at least 100, preferably at least 1000, more preferably at least 5000, more preferably at least 7000, deviations between the target position and the actual position of the conveyor belt 10 can be determined. The first and/or second optical sensor 20*a*, 25*a* can detect images of a plurality of portions along the feed path. The steps of the (planned or desired) stepwise movement may be at least 100 mm, wherein the steps may have a different size, in particular the sizes of the steps need not be constant.

On the basis of the images, the position of the conveyor belt 10 (actual position of the conveyor belt 10) can be determined, in particular after each movement step. The actual position of the conveyor belt 10 can be compared with the size of the steps (target position of the conveyor belt 10) in order to determine a deviation.

The deviation can be determined for a plurality of steps, for example for at least 100 steps, preferably for at least 500 steps, more preferably for at least 1000 steps.

A respective step of the movement can be correlated with the conveyor belt 10. A step can be assigned to a position or a location of the conveyor belt 10. At the same time, a deviation can be assigned to a position or a location of the conveyor belt. Positions or locations can be defined along the conveyor belt 10 starting from a starting point over the entire length or over the entire circumference of the conveyor belt 10. The locations or positions can be unique in the feed direction. A position of the conveyor belt 10 can be uniquely determined by the locations or positions.

For example, the conveyor belt 10 may have a slightly lower thickness at one location than at another location. This can result in a recurring or repeating deviation when the conveyor belt 10 is moved several times over its entire length. By knowing a deviation between the actual position and the target position at a location or position of the conveyor belt 10, the movement of the conveyor belt 10 can be changed in the future when moving over this location or position on the basis of the known position deviation.

Alternatively or additionally, a respective step of the movement of the conveyor belt 10 may be correlated with a position of a roller. The position can be a circumferential angle of the roller. A respective step of the movement of the conveyor belt 10 can be correlated with a position of a first roller and a second roller. A roller can be a drive roller or a roller that is not driven.

For example, the roller may have a slightly smaller radius at one location than at another location. The roller may be (slightly) out of round or conical. This can result in a recurring or repeating deviation when the roller is rotated several times over its entire circumference. By knowing a deviation between the actual position and the target position at a position of the roller, the movement of the conveyor belt 10 (for example caused by a rotation of the roller) can be changed in the future when moving over that position on the basis of the known position deviation.

Preferred values of the deviation, preferably correlated or linked to the position or location of the conveyor belt 10 and/or correlated or linked to the position of the roller, are collected in a table. A distance, in particular a modified or corrected distance, of the movement of the conveyor belt can be determined for the values of the deviation (in each case). This can be done by the evaluation unit. The conveyor belt can be moved on the basis of the distance of the movement, in particular the corrected distance, or the distance of the movement, in particular the corrected distance.

The distance of the movement can be controlled or regulated by a control device 70 of the printing machine. The control device 70 can comprise the evaluation unit 60. The control device 70 can be integrated in the printing machine 100. The control device 70 can be arranged outside the printing machine 100. The control device 70 can be in communication with the printing machine 100 (indicated by the double arrow in FIG. 1).

At least one marking element 50 may be applied to the conveyor belt 10. The marking element 50 can be detachably applied to the conveyor belt 10, for example by bonding. The marking element 50 can extend over the entire length or the entire circumference of the conveyor belt 10, in particular in the feed direction R. The marking element 50 can be printable.

During a movement of the conveyor belt 10 or after a movement of the conveyor belt 10, the marking element 50 can be printed by the printing head 41. In doing so, the printing head 41 can apply the reference markings described above and the position marking or the position markings to the marking element 50. The conveyor belt 10 may or may not move when the marking element 50 is printed.

In the (positive) direction of the feed direction R of the conveyor belt 10, the optical sensor 20*a* may be spaced apart from the printing head 41. The optical sensor 20*a* can be arranged after the printing head 41 or before the printing head 41 in the feed direction R.

The portions of the conveyor belt 10 from which the optical sensor 20 detects images may comprise the marking element 50 (in portions). The portions may be fully portions of the marking element 50. The optical sensor 20*a* may be (fully) directed towards the marking element 50. The images of the optical sensor 20*a* may comprise the reference markings and/or the position marking(s). On the basis of the reference markings and the position marking(s), the evaluation unit can determine a deviation between the target position of the conveyor belt 10 and the actual position of the conveyor belt 10.

In general, a deviation between the target position and the actual position of the conveyor belt 10 can comprise a deviation in the feed direction R that is essentially constant (±10% or ±5%) across the width of the conveyor belt 10. The width can be orientated perpendicular to the feed direction R. Alternatively or additionally, the deviation between the target position and the actual position of the conveyor belt 10, which is not constant across the width of the conveyor belt 10. The deviation can increase or decrease (in portions) in the direction of the width of the conveyor belt 10. The deviation can be positive and/or negative in the direction of the width of the conveyor belt 10. In the direction of the width, the deviation can be positive at one location and negative at another location. If the deviation is positive, there may be a gap in the pattern and if the deviation is negative, there may be an overlap of portions of the pattern.

The deviation in the feed direction R, which is essentially constant (±10% or ±5%) across the width of the conveyor belt 10, can be compensated for by changing the movement of the conveyor belt 10. For example, if the deviation between the actual position of the conveyor belt 10 and the target position of the conveyor belt 10 is positive, there may be a gap in the printed pattern. The target position can be adjusted, for example by reducing the movement step of the conveyor belt 10, so that the deviation becomes smaller or even (within the measurement tolerance) no deviation can be detected.

The deviation in the feed direction R, which is not constant across the width of the conveyor belt 10, can be compensated for by changing the movement of the conveyor belt 10. If, for example, a deviation (within the measurement tolerance) cannot be detected on one side of the conveyor belt 10 and the deviation on the opposite side of the conveyor belt is positive, the movement of the conveyor belt 10 can be changed so that there is a negative deviation on one side of the conveyor belt 10 and a positive deviation on the opposite side of the conveyor belt 10. The amounts of the negative and positive deviations can be essentially the same (±10% or ±5%). In other words, the movement of the conveyor belt 10 can be changed so that there is an overlap in the pattern on one side and a gap in the pattern on the opposite side. The deviation on the opposite side of the transport belt 10 can thus be essentially halved (±10% or ±5%).

The printing machine 100 may include a washing unit 80. The washing unit 80 may be arranged to wash a portion of the conveyor belt 10. In particular, the washing unit 80 can wash or remove colour on the conveyor belt 10, in particular colour from the printing head 41 on the conveyor belt 10.

The washing unit 80 may be formed in a lower area of the printing machine 100. Lower may refer to the direction of gravity.

The conveyor belt 10 may be placed around at least two rollers. The conveyor belt 10 may comprise a portion located above a plane defined by the axes of rotation of the rollers. The conveyor belt 10 can comprise a portion that is located below the plane defined by the axes of rotation of the rollers. The portions can be temporarily above or below the plane. When the conveyor belt 10 is moved, a portion can be moved from above the plane to below the plane or a portion below the plane can be moved to above the plane. The surface of the conveyor belt can run parallel in portions.

The washing unit 80 can be arranged in the printing machine 100 in such a way that the portion of the conveyor belt 10 that is located below the axes of rotation of the rollers can be washed by the washing unit 80, at least in portions.

If a marking element 50 is arranged on the conveyor belt 10, the marking element 50 can be provided with a marking by the printing head 41 in a portion which is located above the plane defined by the axes of rotation of the rollers. If the conveyor belt 10 with the marking element 50 is moved further so that the printed portion of the marking element 50 is below the plane defined by the axes of rotation of the rollers, the marking on the marking element 50 can be removed by the washing unit 80. The portion of the marking element 50 can be moved when the conveyor belt 10 is moved so that the portion is above the plane defined by the axes of rotation of the rollers. The portion of the marking element 50 can again be provided with a marking by the printing head 41.

A marking of the marking element 50 may be removable or washable by the washing unit 80. This allows portions of the marking element 50 to be provided with the markings multiple times. The optical sensor **20*a* can detect images of the marked portion of the marking element 50** in each case.

The conveyor belt 10 can comprise a first marking element 50 and a second marking element 55. Generally, each of the marking elements may be any marking element disclosed herein.

A first optical sensor **20*a* may be associated with the first marking element 50. A second optical sensor 25*a* may be associated with the second marking element 55**.

The first optical sensor **20*a* may be directed towards the first marking element 50. The first optical sensor 20*a* can detect images of markings, in particular reference and/or position markings, on the first marking element 50. The first optical sensor 20*a* can be directed towards the first marking element 50. The second optical sensor 25*a* can detect images of markings, in particular reference and/or position markings, on the second marking element 55**.

The printing head 41 can apply, preferably print, markings, in particular reference and/or position markings, on the first marking element 50 and on the second marking element 55. It is preferred that the printing head 41 applies markings to the first marking element 50 and the second marking element 55 while the conveyor belt 10 is not moving. In particular, at least one marking can be applied to the first marking element 50 and at least one marking can be applied to the second marking element 55 without the conveyor belt moving.

Figure 2:
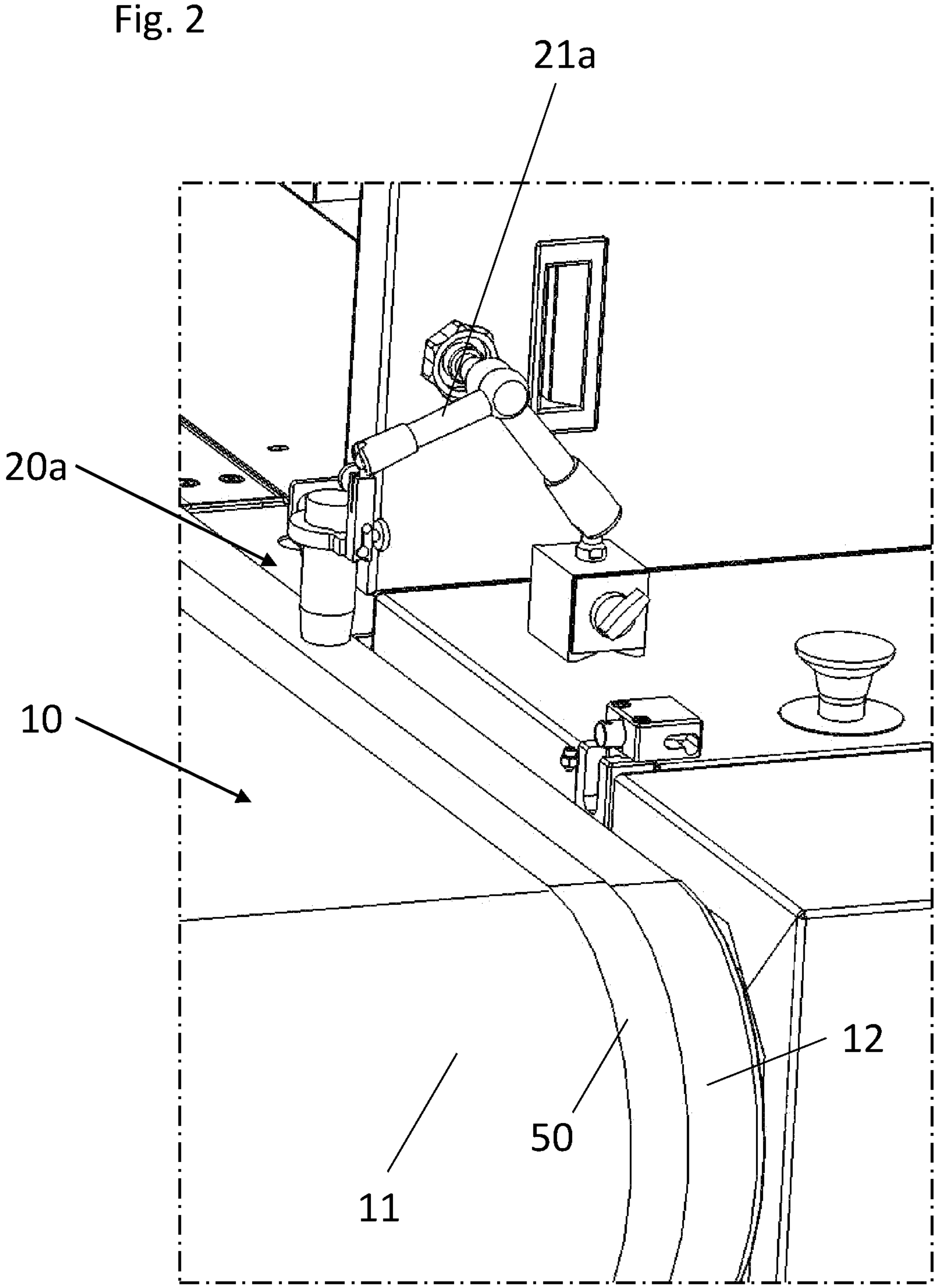
FIG. 2 shows an optical sensor 20*a* in one embodiment.

FIG. 2 shows an enlarged section of the printing machine 100 with a view of a first optical sensor **20*a*. The marking element 50 is applied to the conveyor belt 10. The optical sensor 20*a* can be held by a bracket 21*a***.

The conveyor belt 10 may comprise a first portion 11 having a layer. The layer may comprise a thermoplastic or the layer may be a thermoplastic layer. The conveyor belt 10 may include a second portion 12 that does not have the layer. The first portion 11 of the conveyor belt 10 may be a portion that can be reached by the printing head 41, i.e. a material to be printed on the conveyor belt 10 can be printed in this portion 11 by the printing head 41. The second portion 12 of the conveyor belt 10 can be a portion that cannot be reached by the printing head 41, i.e. a material to be printed on the conveyor belt 10 in the second portion 12 cannot be printed on by the printing head 41.

The marking element 50 can be arranged on the portion 11, in particular arranged completely. A layer in the first portion 11 can be used to create or reinforce a connection between the marking element 50 and the conveyor belt 10.

No material to be printed can be arranged on the conveyor belt 10 when the marking element 50 is arranged on the conveyor belt 10. In particular, the optical sensor 20*a* cannot detect images of portions of the conveyor belt 10 when a material to be printed is arranged on the conveyor belt. The optical sensor 20*a* can detect images of portions of the conveyor belt 10 when no material to be printed is arranged on the conveyor belt. The optical sensor 20*a* can also detect images of portions of the conveyor belt 10 when a material to be printed is arranged on the conveyor belt 10.

For example, the optical sensor 20*a* can detect images of portions of the conveyor belt 10 without a material to be printed being arranged on the conveyor belt 10. On the basis of the images, positions of the conveyor belt 10 can be determined by the evaluation unit 60, in particular for a plurality of movement steps of the conveyor belt 10. Preferred, deviations from target positions and actual positions of the conveyor belt 10 are determined by the evaluation unit 60. On the basis of the positions of the conveyor belt 10 and/or the deviations, the movement steps can be adjusted in such a way that deviations between actual positions and target positions of the conveyor belt 10 are at least partially reduced.

If a material to be printed is arranged on the conveyor belt 10, the conveyor belt 10 can be moved according to the adapted movement steps. Between or during the movement steps, the material to be printed can be printed on, for example by the printing head 41. When printing on the material to be printed on, the marking element 50 may not be arranged on the conveyor belt 10.

Alternatively, the material to be printed can be arranged on the conveyor belt 10 when the marking element 50 is arranged on the conveyor belt 10. The material to be printed is preferably arranged in the first portion 11. The marking element 50 may be arranged on the first portion 11 and/or on the second portion 12.

Figure 3:
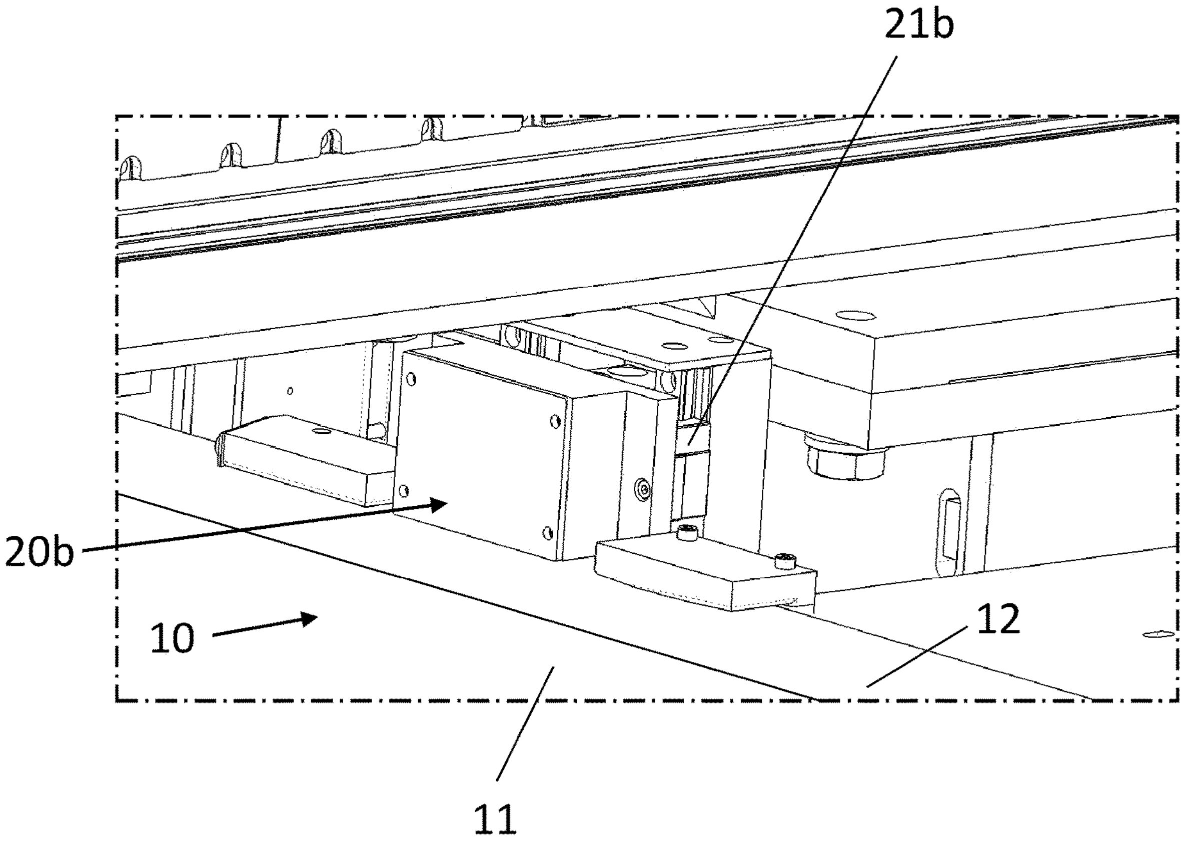
FIG. 3 shows an optical sensor 20*b* in a further embodiment.

FIG. 3 shows an enlarged section of the printing machine 100 with a view of a first optical sensor 20*b* in a further embodiment. The optical sensor 20*b* may be held by a bracket 21*b*. A second optical sensor may be provided (not shown in FIG. 3). The second optical sensor may be (substantially) the same or analogue to the first optical sensor.

The optical sensor 20*b* may be directed towards the second portion 12 of the conveyor belt 10. Alternatively, the optical sensor 20*b* may be directed towards the first portion 11 of the conveyor belt 10. No marking element 50 can be arranged on the conveyor belt 10 when the optical sensor 20*b* detects images of portions of the conveyor belt 10. In particular, the portions of the conveyor belt 10 from which the optical sensor 20*b* captures images can be a (direct) surface of the conveyor belt 10.

Preferably, a material to be printed is arranged on the conveyor belt 10 when the optical sensor 20*b* detects images of portions of the conveyor belt 10. This allows deviations between actual positions and target positions of the conveyor belt 10 to be determined during operation, so that dynamic changes can also be detected. Alternatively or additionally, the optical sensor 20*b* can detect images of portions of the conveyor belt 10 when no material to be printed is arranged on the conveyor belt 10.

If images of portions of the conveyor belt 10 are detected and a position of the conveyor belt 10 is determined while the material to be printed is arranged on the conveyor belt 10 (and being printed), the movement of the conveyor belt 10 can be regulated on the basis of the determined positions.

A permanent determination of positions of the conveyor belt 10 or of deviations between actual positions and target positions of the conveyor belt 10 can be provided. The continuous determination can extend over a period of at least 1 h, preferably at least 3 h, more preferably at least 5 h, more preferably at least 15 h, more preferably at least 30 h or 50 h, in particular continuously. The optical sensor 20*b* can be arranged to determine position data of the conveyor belt 10. For this purpose, the optical sensor 20*b* can comprise an evaluation unit. The evaluation unit of the optical sensor 20*b* can be any evaluation unit 60 disclosed herein.

The optical sensor 20*b* may comprise a digital signal processor (DSP). The optical sensor 20*b* may be arranged to determine a change in position on the basis of images detected by the optical sensor 20*b*. Preferably, the digital signal processor of the optical sensor 20*b* is arranged to determine a position change on the basis of images detected by the optical sensor 20*b*. The change in position can be a change in position of the conveyor belt 10.

The optical sensor 20*b*, in particular the digital signal processor of the optical sensor 20*b*, can be arranged to determine a position change in a first direction and/or a position change in a second direction, which is not parallel to the first direction, in particular which is perpendicular to the first direction, on the basis of the images detected by the optical sensor 20*b*. The first direction can be the feed direction R.

A microcontroller of the optical sensor 20*b* may receive the data of the position change(s). The microcontroller can convert the data of the position change(s) into a USB signal or an RF signal. The converted data can be transmitted to the evaluation unit 60 or a control device 70.

The optical sensor 20*b* may comprise a lens. The lens may be a magnifying lens.

LIST OF REFERENCE NUMERALS

10 Conveyor belt
11 Portion
12 Portion
20*a* Optical sensor
20*b* Optical sensor
21*a* Bracket
21*b* Bracket
25*a* Optical sensor
26 Bracket
40 Printing head support
41 Printing head
50 Marking element
55 Marking element
60 Evaluation unit
70 Control device
80 Washing unit
100 Printing machine
R Feed direction

The invention claimed is:

1. A printing machine for printing a material including a fabric, paper, cardboard, plastic, wood or metal, comprising:

a conveyor belt, wherein the conveyor belt is movable in a feed direction over a feed path, wherein the conveyor belt comprises a plurality of portions along the feed direction over the feed path;

an optical sensor, wherein the optical sensor is arranged to detect at least one image of each portion of the plurality of portions of the conveyor belt sequentially; and an evaluation unit which is arranged to determine a position of the conveyor belt based on the images of the plurality of portions of the conveyor belt, wherein the optical sensor comprises a first optical sensor and a second optical sensor which are formed in a same way and are spaced apart from each other in a direction which is not parallel to the feed direction, and wherein a printing head is movable relative to the conveyor belt in a direction that is not parallel to the feed direction, wherein the conveyor belt has a width of at least 1.0 m.

2. The printing machine according to claim 1, wherein the optical sensor is arranged stationarily on the printing machine or is arranged stationarily relative to the printing machine.

3. The printing machine according to claim 1, wherein the first and second optical sensors are directed towards or associated with opposite edges of the conveyor belt.

4. The printing machine according to claim 3, wherein the plurality of portions along the feed direction over the feed path is a first plurality of portions along the feed direction over the feed path and the conveyor belt comprises a second plurality of portions along the feed direction over the feed path, wherein the first plurality of portions and the second plurality of portions are spaced apart from each other in the direction that is not parallel to the feed direction, wherein the first optical sensor is arranged to detect at least one image of each portion of the first plurality of portions sequentially and the second optical sensor is arranged to detect at least one image of each portion of the second plurality of portions sequentially, and wherein the evaluation unit is arranged to determine the position of the conveyor belt based on the images of the first plurality of portions and the second plurality of portions.

5. The printing machine according to claim 1, wherein the conveyor belt is movable along the feed direction over the feed path discontinuously, with interruptions or stepwise.

6. The printing machine according to claim 1, wherein the conveyor belt comprises a marking element, wherein the portions of the plurality of portions of the conveyor belt comprise or are portions of the marking element, and wherein the printing head is arranged to apply a marking to the marking element.

7. The printing machine according to claim 6, wherein the marking element is removably applied to a surface of the conveyor belt.

8. The printing machine according to claim 6, wherein the marking element extends continuously over the feed path along the feed direction, and the marking element extends completely continuously along the feed direction on the conveyor belt.

9. The printing machine according to claim 6, wherein the evaluation unit is arranged to determine the position of the conveyor belt based on the marking of the marking element.

10. The printing machine according to claim 6, wherein the marking element is a first marking element and the conveyor belt comprises a second marking element, wherein the first marking element and the second marking element are spaced apart in a direction that is not parallel to the feed direction, and wherein the printing head is arranged to apply a marking to the first marking element and to the second marking element.

11. The printing machine according to claim 1, wherein the portions of the plurality of portions of the conveyor belt comprise or are portions of a surface of the conveyor belt.

12. The printing machine according to claim 1, wherein the optical sensor has a resolution of at least 400 dpi.

13. The printing machine according to claim 1, wherein the optical sensor comprises a light-emitting diode or a laser diode that emits light with a wavelength of greater than 800 nm.

14. The printing machine according to claim 1, wherein a distance between a surface of the conveyor belt and the optical sensor is less than 20.0 mm.

15. A method for operating a printing machine, comprising:

moving a conveyor belt of the printing machine in a feed direction over a feed path stepwise for at least 100 steps, wherein the conveyor belt comprises a plurality of portions along the feed direction over the feed path, wherein the number of the plurality of portions is equal to the number of steps;

sequentially detecting at least one image of each portion of the plurality of portions of the conveyor belt by a first optical sensor and a second optical sensor which are formed in a same way and which are spaced apart from each other in a direction which is not parallel to the feed direction;

determining a deviation between an actual position and a target position of the conveyor belt based on the images of the plurality of portions of the conveyor belt; and adjusting a movement of the conveyor belt based on the deviation between the actual position and the target position of the conveyor belt.

16. A printing machine for printing a material including a fabric, paper, cardboard, plastic, wood or metal, comprising:

a conveyor belt, wherein the conveyor belt is movable in a feed direction over a feed path, wherein the conveyor belt comprises a plurality of portions along the feed direction over the feed path;

an optical sensor, wherein the optical sensor is arranged to detect at least one image of each portion of the plurality of portions of the conveyor belt sequentially; and an evaluation unit which is arranged to determine a position of the conveyor belt based on the images of the plurality of portions of the conveyor belt, wherein the plurality of portions do not include a mark.

* * * * *